United States Patent Office 2,788,361
Patented Apr. 9, 1957

2,788,361
PROCESS FOR THE MANUFACTURE OF BENZONITRILE

Walter Wettstein, Munchenstein, and Alfred Renner and Gustav Widmer, Basel, Switzerland, assignors to Ciba Limited, Basel, Switzerland, a firm of Switzerland No Drawing. Application November 14, 1955,
Serial No. 546,771

Claims priority, application Switzerland
November 17, 1954

5 Claims. (Cl. 260—465)

It is known that phthalonitrile can be made from phthalic anhydride and ammonia or from nitrogen-containing functional derivaties of phthalic acid, for example, phthalimide or phthalic acid diamide, by passing them in a current of ammonia over a catalyst capable of eliminating water, such as thorium oxide, silica gel, alumina, aluminium silicates, aluminium phosphates etc. It has been stated that these processes also yield minor quantities of benzonitrile as a by-product. When silica gel is used as catalyst a temperature of 360° C. is said to be favorable for the production of phthalonitrile.

There has already been described a process for the production of benzonitrile wherein the vapor of phthalic anhydride in admixture with ammonia gas is passed over aluminum oxide at a temperature exceeding 450° C., whereby benzonitrile is obtained in a yield amounting to 70–80 percent of the theoretical yield. As a modification of this process there has been proposed to add a heavy metal oxide, especially zinc oxide or cobalt oxide, to the aluminum oxide, whereby the reaction temperature can be reduced, so that a temperature of 350–420° C. can be used. The yields in this modified process amount also to 70–80 percent of the theoretical yield. In both processes a very large excess of ammonia, amounting to about 100 times the theoretical amount, is used. Thus, 60 grams of phthalic anhydride require 1000 litres of ammonia gas.

The present invention is based on the observation that benzonitrile can be obtained in excellent yield by passing phthalimide in the form of vapor either alone or in admixture with an inert gas, such as air, nitrogen, ammonia, carbon dioxide, water vapor, benzene vapor or the like, at a temperature from above 360° C. to about 500° C. over silica gel. Instead of using an inert carrier or diluent, it will be understood that the process may be carried out under reduced pressure, for example, about 100–300 millimetres of mercury, the phthalimide being vaporized at the boiling temperature corresponding to the pressure used, and being distilled over the catalyst without any addition, and thereby decarboxylated. Alternatively the phthalimide may be distilled over the catalyst at atmospheric pressure.

As phthalic anhydride reacts with ammonia according to the equation

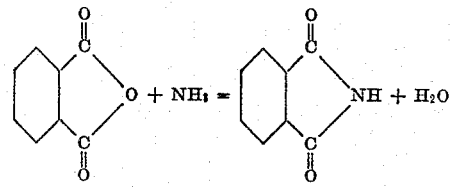

the vapor of phthalimide necessary for the present process may intermediately be prepared in the course and under the conditions of said process by mixing in known manner at least one equivalent of ammonia gas with phthalic anhydride vapor with or without the addition of an inert diluent.

The temperature used to produce the benzonitrile may vary within wide limits. However, the reaction is not complete at temperatures below about 400° C., but the unreacted phthalimide can be returned to the process. It is preferable to work at about 390–420° C. The nature of the silica gel used as catalyst has an important influence on the course of the catalysis. The most active is the so-called large-pored silica gel (see FIAT Final Report No. 1313, PB 85172, vol. I, pages 394–396, silica gel B), which in the granular state has a grain size of 1–3 millimetres and a bulk density of 0.46–0.48. Small-pored silica gel is considerably less active. Acidic impurities, such as sodium bisulfate, potassium bisulfate or phophoric acid or the like, strongly inhibit the catalysis, since they preferentially promote the elimination of water rather than the splitting off of carbon dioxide.

The following examples illustrate the invention, the parts being by weight unless otherwise stated and the relationship of parts by weight to parts by volume being the same as that of the kilogram to the litre, and the volumes of vapor and gas being calculated at 20° C. and at 740 millimetres pressure.

Example 1

Nitrogen is passed at the rate of 1000 parts by volume per hour through an evaporation vessel, in which phthalimide at a temperature of 260° C. is contained, whereby the phthalimide is vaporized at the rate of about 1 part per hour. The stream of nitrogen charged with phthalimide is then passed through a contact tube heated at 410° C., which contains 6 parts by volume of granular silica gel B having a grain size of 1–3 millimetres (prepared according to FIAT Final Report No. 1313, PB 85172, vol. I, page 396, last paragraph). The gases leaving the contact tube are cooled to room temperature, whereupon the resulting benzonitrile and also about 2–5 percent of the phthalimide vapor condense. From 10 parts of vaporized phthalimide 6.5 to 6.7 parts of benzonitrile are obtained, which corresponds to a yield amounting to 93–95.5 percent of the theoretical yield. Taking into account the fact that the condensed phthalimide is reintroduced with the starting material, the yield is almost quantitative.

Example 2

The procedure is the same as described in Example 1, except that ammonia gas is used instead of nitrogen. The result is approximately the same, but there is obtained a mixture of phthalonitrile and phthalimide, instead of phthalimide.

Example 3

The procedure is the same as described in Example 1, except that air is used as the carrier gas instead of nitrogen. The result is the same as in Example 1.

Example 4

Air is passed at the rate of 12,000 parts by volume per hour through an evaporation vessel, which contains phthalic anhydride heated at about 230° C., whereby about 36 parts of phthalic anhydride are vaporized per hour. 11 parts of gaseous ammonia per hour are mixed with the stream of air charged with phthalic anhydride. The gaseous mixture so obtained and preheated at 310° C. is then passed through a contact tube heated at 415° C., which contains 220 parts by volume of the silica gel used in Example 1 having a grain size or 2–5 millimetres. The gases issuing from the contact tube are cooled to room temperature, whereupon benzonitrile, a small amount of water and a little unreacted phthalimide condensed. The reaction mixture is taken up in ether, the water is removed therefrom, and the ethereal solution is dried over calcium chloride and filtered. The ether is then removed and the benzonitrile remaining behind is purified by vacuum distillation (the product boiling at 73° C. under 11 millimetres pressure). The yield amounts to about 85 percent of the theoretical yield.

What is claimed is:

1. A process for the manufacture of benzontrile, wherein phthalimide is passed over large-pored silica gel having a bulk density below 0.5 at a temperature from above 360° C. and up to about 500° C.

2. A process for the manufacture of benzonitrile, wherein phthalimide is passed over large-pored silica gel having a bulk density below 0.5 at a temperature within the range of 390–420° C.

3. A process for the manufacture of benzonitrile, wherein phthalimide is passed over large-pored silica gel having a bulk density below 0.5 at a temperature from above 360° C. and up to about 500° C., in which process the phthalimide is admixed with an inert gas.

4. A process for the manufacture of benzonitrile, wherein phthalimide is passed over large-pored silica gel having a bulk density below 0.5 at a temperature within the range of 390–420° C., in which process the phthalimide is admixed with an inert gas.

5. A process for the manufacture of benzonitrile, wherein phthalimide is passed over large-pored silica gel having a bulk density below 0.5 at a temperature from above 360° C. and up to about 500° C., said phthalimide being intermediately prepared by the reaction of phthalic anhydride with ammonia in the course and under the conditions of said process.

References Cited in the file of this patent

UNITED STATES PATENTS

| | | |
|---|---|---|
| 2,054,088 | Linstead et al. | Sept. 15, 1936 |
| 2,100,401 | Linstead et al. | Nov. 30, 1937 |
| 2,149,280 | Deem et al. | Mar. 7, 1939 |

FOREIGN PATENTS

| | | |
|---|---|---|
| 1,045,337 | France | June 24, 1953 |